MULTI-STAGE LOGICAL SYSTEM

INVENTOR
MERLE E. HOMAN
BY Roy C. Hopgood
ATTORNEY

Oct. 27, 1964 M. E. HOMAN 3,154,675

ASYNCHRONOUS LOGICAL SYSTEMS FOR DIGITAL COMPUTERS

Filed Nov. 23, 1960 5 Sheets-Sheet 2

United States Patent Office 3,154,675
Patented Oct. 27, 1964

3,154,675
ASYNCHRONOUS LOGICAL SYSTEMS FOR DIGITAL COMPUTERS

Merle E. Homan, Poughkeepsie, N.Y., assignor to International Business Machines Corporation, New York, N.Y., a corporation of New York Filed Nov. 23, 1960, Ser. No. 71,205
15 Claims. (Cl. 235—164)

The present invention relates to logical circuit systems of the kind especially adapted for use in digital computers, amongst other applications.

Logic systems may be divided conveniently into synchronous and asynchronous systems. In either type of system, there is a certain time lag from the instant that a command signal actuates the system to perform an operation on input operand signals until completion of the operation. During this time interval the output stage may reflect temporary results which are not valid output information. For example, in arithmetic operations, say adding, the output stage may reflect the proper binary digit (bit) resulting from the addition of merely the addend and augend bits of a given binary denomination. Such output sum bit may not be the final, valid bit in case a carry bit 1 is generated as the result of the addition in the last previous denomination. Introducing the carry bit 1 will invert the bit obtained from the addition of the addend and augend bit alone. A zero will be changed to a one, and vice versa. The carry may be propagated through several denominations with appreciable delay, which may be no more than the inherent delay of the circuits propagating the carry.

In synchronous systems, that is systems including periodic clock pulses, there is no uncertainty as to the validity of the result. A maximum time may be allotted for addition, and the output is not sensed until such maximum time has elapsed. Physically this may be achieved, for example, by gating the final result after lapse of the maximum time into a register by means of a gating pulse derived from a clock pulse. In asynchronous systems, with which the present invention is principally concerned, the prior art had used an analogous approach. Since clock pulses are not available in asynchronous systems, it had been the practice heretofore to delay sensing the output until lapse of the maximum time required for a given arithmetic operation. Physically this may be accomplished by generating a pulse that has a duration equal to the maximum operation time, utilizing its leading edge to commence the operation, and its trailing edge to gate the result into a register.

A principal shortcoming of the prior art approaches is the requirement of delaying reading in the result into a register until the maximum operation time has elapsed under all circumstances. Many arithmetic operations seldom require the maximum operating time. Consider the parallel addition of two multibit numbers having such values that no carriers are produced. By "parallel" addition is meant the concurrent addition of the several addend and augend bits in each denomination, in contrast to "serial" addition where the bits are added one at a time, beginning with the least significant denomination. In the parallel multi-bit addition, where no carries are produced, the entire addition is complete practically instantly. At the other extreme is the subtraction from a minuend of a subtrahend equal to the minuend, so that the difference is zero. Commonly subtraction is performed by adding the complement of the subtrahend to the minuend, further adding one in the lowest denomination and deleting any overflow one in the denomination higher than the highest available. The complement of a given number is that number in which every zero of the given number is replaced by a one and vice versa. An example will make this clear.

Let the minuend and subtrahend both be 10011101 (expressed in the binary number system; this is the binary representation for decimal 157). Commonly computing systems are set up to generate a number and its complement concurrently. For addition the principal number is used, and for subtraction its complement. For subtraction the complement is added to the minuend. This renders separate subtraction circuitry unnecessary. The complement of 10011101 is 01100010. Adding the latter two numbers results in 11111111; this is not the required result. A first correction is obtained by adding 1 in the lowest denomination, resulting in 100000000. It should be noted that in arriving at the latter result a carry was propagated from the lowest denomination to the highest denomination. A carry propagated through all denominations entails the longest possible time delay, since the carry must pass through all the logic stages of the several denominations. The number 100000000 is still not the correct result; the final correction is obtained by deleting the "1" in the ninth, overflow denomination, resulting in the required 00000000.

Adding two numbers without generating any carry and subtracting a number from itself would represent the extremes in operation time in a dynamic system, but not necessarily in a static system. In a dynamic system as in a static system binary 1 is signified by presence of one of two significant potential levels and binary zero by presence of the other. In a static system a given stage remains at one of the two potentials continuously until switched to the other potential, and remains at the other potential continuously until reswitched to the initial potential. In a dynamic system the potential of a given stage has numerical significance only at certain times; at all other times the stage assumes the potential corresponding to binary zero. In the broad sense, synchronous and dynamic may be treated as synonymous, and likewise for asynchronous and static, but exceptions may arise in either case.

The present invention is most principally concerned with asynchronous static logic. Here an example of minimum operating time would be repeating the addition of two numbers previously added and not subjected to any change since the last previous addition. The addition is complete as soon as a command to add anew is given, as no changes occur anywhere in potential levels. An example of maximum operating time is the subtraction of 11111111 from itself following a previous addition of 00000000 to itself. Here almost every stage in each denomination undergoes multiple changes, one due to the change in the bits, and the other due to the propagation of the carry from the lowest denomination to the highest.

It is a principal object of the invention to provide asynchronous logic circuitry incorporating circuit means that suppresses sensing of temporary results for the minimum time necessary and that permits sensing final results as soon as they are available.

A more specific object of the invention is the provision of asynchronous arithmetic circuits operating as set forth in the preceding object.

The present trend in digital computer circuits is to use transistors as logic elements almost exclusively. Transistors are superior to vacuum tubes in regard to physical size, power requirements, and lack of necessity for filament heating. A further advantage of transistors resides in their availability in complementary npn and pnp junction types. By arranging the logical blocks in a cascade, such that one set of alternate blocks are composed of npn transistors and the other of pnp transistors, successive blocks may be directly coupled, so that bulky coupling capacitors or transformers may be avoided. Instead resistive coupling networks are used between successive stages for the purpose of changing the voltage level available at the output of a stage to a voltage level suitable as input for the next succeeding stage. Transistors are also superior to diodes in the use as logic elements, since transistors are capable of performing the switching function with amplification. Accordingly, it is a still further object of the invention to achieve the aforegoing objects with the use of transistors to the exclusion of tubes or diodes. While the invention will be described with reference to transistor circuits, it should be understood that the inventive principles are applicable to logic circuits employing tubes or diodes or other logical circuit elements. The underlying concept of the invention will be explained with reference to FIG. 1 of the drawings.

Other objects, advantages and novel features of the invention will be apparent from the following more detailed specification of which the appended claims form a part, when considered together with the accompanying drawings, in which:

FIG. 1 is a logical drawing of generalized logic circuitry incorporating the principles of the invention;

FIG. 1*a* is a waveshape graph illustrating the time sequence of information blocking pulses generated by circuitry included in FIG. 1;

FIG. 2 is a logical drawing of an adder stage with associated storage register in accordance with a preferred embodiment of the invention;

FIG. 2*a* is a waveshape graph illustrating the time sequence of signals generated, in the course of an addition, by the apparatus of FIG. 2;

FIG. 3 is a logical diagram of a multi-denomination parallel adder incorporating adder stages illustrated in FIG. 2;

FIGS. 4 to 9 illustrate logical elements used in the systems of FIGS. 1, 2 and 3. Each of the FIGS. 4 to 9 is divided into an "*a*" part illustrating a logical block used in one of the preceding figures and a "*b*" part illustrating the corresponding circuit. More particularly, FIG. 4 is an illustration of a positive "and" circuit (equivalent to a negative "or" circuit);

Figures 1, 1A:
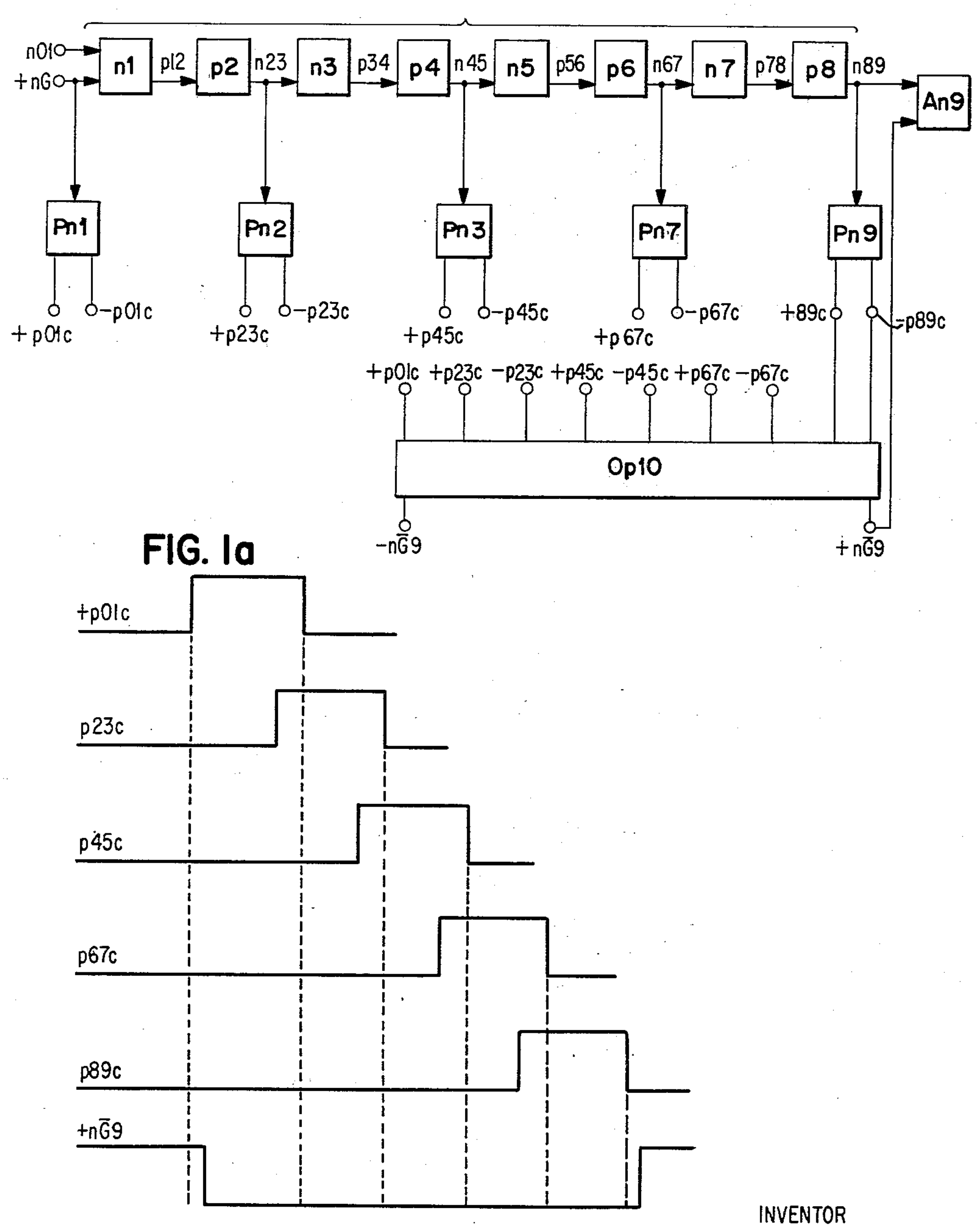

In the following description several simplifying conventions will be employed. A signal source, a line carrying a signal, an output terminal that delivers the signal, and an input terminal that accepts the signal will be designated explicitly or implicitly by the same reference character. The bivalued or two-level or on-off signals will be treated on a voltage logic basis. A positive signal is "present" or "up" when at the higher potential and is otherwise "absent" or "down," and conversely for negative signals. A signal having no sign is a positive signal, unless otherwise specified. All negative signals are explicity designated by a minus sign. A complement or negation signal is a signal which is present when its principal signal is absent and vice versa. The complement signal is indicated by a bar above the reference character. A positive complement signal is present when at the higher potential; a negative complement signal is present when at the lower potential, as in the case of principal signals.

A block composed of pnp transistors will be referred to as an "n" block, and one composed of npn transistors as a "p" block to denote the conductivity type of the transistor bases within a block. Signals are usually prefaced by an "n" or a "p" to indicate the conductivity of the transistor base to which the signal is applied. Therefore, an "n" block accepts "n" input signals and delivers "p" output signals, which may serve as input signals for "p" blocks. The output signals of "p" blocks may serve as input signals as "n" blocks and are, therefore, designated by "n." Input signals are usually shown as lines leading to the left of a block. Output signals are generated in complementary pairs in most instances and are shown as lines or terminals leaving the block from its right. The signal derived from the lower output terminal usually bears the same sign as the block itself and is present when the logical function of the block is performed. Where all the input signals of block bear the same sign, the principal output signal (issuing from the lower right terminal) will bear the same sign. It is, therefore, considered the "in phase" output signal. The output signal issuing from the upper right terminal of a block assumes a potential level opposite to that of the lower right terminal. It is, therefore, considered the "out of phase" signal. It is sometimes prefaced by a sign opposite to that of the principal signal; on this basis the signals are considered to be bipolar, and present or absent concurrently. The out-of-phase signal in other instances is considered to be the complement of the principal signal, in which case it will be present when the principal signal is absent, and vice versa, and will bear the same sign as the principal signal. The out-of-phase signal considered as a complement signal will usually bear a bar above the signal identifying character, and its principal signal will not, but this relation may be inverted upon occasion to signify that the out-of-phase signal when present performs an enabling function rather than an inhibiting function. In some instances, the output signals are designated by opposite signs to indicate that they are of bipolar character, present and absent concurrently, and are further both designated by a bar above the reference character to indicate negation or inhibition when the signals are concurrently present. Although the output signals are available in bipolar or complementary pairs, only one signal may be shown in instances where the other signal is not used.

Referring to FIG. 1, a multi-stage logical system is composed of consective logical blocks ***n*1, *p*2, *n*3, *p*4, *n*5, *p*6, *n*7 and *p*8. Each block has a small but definite inherent time delay, and therefore the numerical designation of a given block denotes the approximate cumulative time delay from the input of the block *n*1** to the output of the block in question. As will be seen, the cumulative time delay is an important factor governing the performance of the apparatus of the invention.

The indicated logical system may be considered to be of most general nature, and therefore the individual blocks may be "and" blocks, "or" blocks or other logic. Each block receives from the previous block an input signal that, in line with the previously stated convention, bears the same letter ("n" or "p") as the signal receiving block itself to indicate the conductivity type of the transistor bases within the block. The input signals also bear a two-digit decimal number. The units' digit signifies the block to which the signal is applied, and the tens' digit signifies the block from which the signal issues. Thus, the signal ***p*34 is derived from "n" block *n*3 and is applied to "p" block *p*4. Consistent with this notation, the initial block accepts input signal *n*01**, and further accepts a gating signal *n*G. Initiation of the signal *n*G is a command to the logical system to perform its logical function. It is assumed that the signal ***n*01** changes its state, if at all, substantially concurrently with the initiation of the *n*G signal.

Figure 6A:
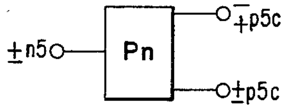
FIG. 6 is an illustration of a pulse forming circuit.
Figure 6B:
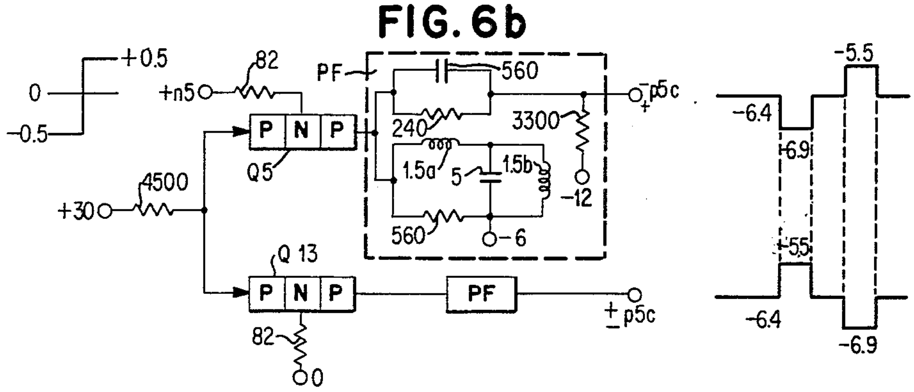

The $nG$ signal and the output signals generated by the "p" blocks, namely signals $n23$, $n45$, $n67$ and $n89$, are additionally applied to pulse generators P$n1$, P$n3$, P$n5$, P$n7$ and P$n9$ respectively. The numerical designation of the pulse generators is likewise intended to connote the approximate number of unit delays from the input to block $n1$ to the output of the particular P$n$ block in question. The structure and operation of the pulse generators is explained with reference to FIG. 6. The pulse generator P$n$ of FIG. 6$a$ accepts input signal $\pm n5$ and delivers bipolar output signals $\pm p5c$ and $\mp p5c$. The letter "$c$" is associated with output signals of all pulse generators and connotes that these output signals are generated only in response to change in potential state of the input signal potential. Referring also to FIG. 6$b$, the input signal $\pm n5$ may typically be at a lower potential of $-0.5$ volt or at a higher potential of $+0.5$ volt. Under steady-state conditions, the potential of each of the output terminals is typically $-6.4$ volts irrespective of whether the input potential is $-0.5$ volt or $+0.5$ volt. When the input signal switches from the lower to the higher potential, the in-phase output signal is formed as a positive pulse at a level of $-5.5$ volts whereas the out-of-phase output signal is formed as a negative pulse at a level of $-6.9$ volts. When the input signal switches from the higher to the lower potential the two output terminals deliver, respectively, a negative and a positive pulse with levels of $-6.9$ and $-5.5$ volts respectively. The steady-state level of $-6.4$ volts, and necessarily also the negative pulse level of $-6.9$ volts inhibit conduction of npn transistors which receive the output signals of the pulse generator. The positive pulse level of $-5.5$ volts enables such conduction. The pulse duration is determined by the circuit constants of the two identical pulse forming networks PF, which are connected to the collectors of pnp transistors Q5 and Q13 respectively. The pulse generators P$n$ are seen to be monostable devices or "transient detectors," which generate bipolar pulses in response to switching of the input signal in either direction. Other suitable monostable devices, for example multivibrators or blocking oscillators may be substituted.

The emitters (identified by arrowheads indicating direction of current flow) of the transistors Q5 and Q13 are commoned through a 4500 ohm resistor to a $+30$ volt source. Resistors are designated by reference numerals that are the same as the nominal value of the resistors in ohms; similarly, for inductances expressed in microhenries and capacitors in micro-microfarads. The emitter supply approximates a constant current source. Emitter current flows to that transistor whose base is at the most negative potential. The base of Q13 is connected through an 82 ohm resistor to 0 volts (ground potential). The base of Q5 receives the input signal $\pm n5$ through another 82 ohm resistor. When the input signal is at $-0.5$ volt, the base of Q5 is most negative and Q5 conducts emitter and collector current. When the input signal is at $+0.5$ volt, the base of Q13 is most negative and Q13 conducts emitter and collector current. In either steady-state condition, the collector of each transistor is at $-6$ volts applied from the $-6$ volt source through the two serially connected inductances 1.5*a* and 1.5*b*. The output potential is lowered to $-6.4$ volts by means of a voltage divider that includes resistors 240 and 3300, whose non-common ends are tied to the collector and to the $-12$ volts source, and whose common ends form the output terminals.

Upon change of the level of the input signal the states of conduction and non-conduction of the two transistors will be interchanged. The newly conducting transistor's pulse forming network PF will form a positive pulse by means of the delay line that includes the series inductances 1.5*a* and 1.5*b* and shunt capacitance 5. The delay line is shunted at its sending end (at the collector) by a 560 ohm resistor, which matches the characteristic impedance of the line. It is short-circuited at its receiving end to the $-6$ volt source, to which resistor 560 and capacitor 5 are also tied. The pulse travels the length of the line and is inverted in polarity and reflected at the receiving end. When the reflected pulse returns to the sending end, it cancels the originally generated pulse to terminate the latter. In similar manner the newly non-conducting transistor generates the negative pulse.

Returning to the consideration of the circuitry of FIG. 1, the pulse periods of each of the pulse generators is selected to be greater than the worst cumulative delay time anticipated for two successive stages in the multi-stage logical chain, and preferably approach a duration of the worst cumulative delay time of two successive logical stages and one pulse generator stage. Reference to FIG. 1$a$ will make this clear. Let it be assumed that with the initiation of the new $nG$ signal every logical stage in the chain, or at least every "n" signal will undergo a change in potential level, so that each pulse generator will produce bipolar pulses. In FIG. 1$a$ only the respective positive pulses are indicated, namely pulses $p01c$, $p23c$, $p45c$, $p67c$ and $p89c$. In the present context, the last mentioned pulses are not necessarily pulses produced at the lower output terminals of the respective pulse generators, but rather are the positive pulses produced by them at whichever terminal the logic called for their production. However, since the $+nG$ signal is arbitrarily assumed to have a positive leading edge, in response to which the logical system perform its function, the signal $+p01$ represented in FIG. 1$a$ is truly the in-phase output signal of the block P$n1$.

In response to the initiation of the $+nG$ signal, the pulse generator P$n1$ upon lapse of its own inherent response delay time (as distinguished from its pulse time), will generate the $p01c$ signals, and the stage $p2$ will produce, after lapse of the inherent delay time of the stages $n1$ and $p2$, a change in the $n23$ signal. The change in the $n23$ signal produces, after lapse of the inherent response delay time of the pulse generator P$n3$, the $p23c$ signals. These commence and must commence before the $p01$ signals terminate under all circumstances. The extreme situation would be that of the pulse generator P$n1$ having minimum inherent delay and the blocks $n1$, $p2$ and P$n3$ having maximum or "worst" delay. Therefore, the pulses $p01c$ must have a duration greater than the worst delay of two logical blocks, and preferably such duration should approach the worst delay time of three logical blocks. The pulse durations of the remaining pulse generators are governed by the same principles. Consequently, as shown in FIG. 1$a$, each of the succeeding pulse signals $p23$, etc., commences before the immediately preceding pulse signal terminates.

The output signals of the generators P$n3$ to P$n9$ are applied as input signals to the positive "or" gate O$p10$ in bipolar pairs. This assures application of one positive pulse from each of these pulse generators irrespective of the direction of change of the input signals applied to the pulse generators. On the other hand, only the $+p01$ signal (and not the $-p01$ signal) is applied from the pulse generator P$n1$ to the block O$p10$. This is because of the assumption that the logical operation is initiated by the positive going leading edge of the $+nG$ signal and avoids generation of another positive pulse at the termination of the $+nG$ signal. If the logical operation were initiated by a gating signal having a negative going leading edge, the $-p01c$ rather than the $+p01c$ signal would be applied to the block O$p10$. Or the gating signal may be one of long duration at either potential level, and initiation of the logical operation may be indicated by switching of the potential levels of the gatting signal in either direction. In such case, both dipolar $p01c$ signals would be applied to the block O$p10$.

The out-of-phase output signal of the block O$p10$, designated as $+n\overline{G}9$, is applied as input signal to a positive "and" gate A$n9$, which also receives the signal $n89$ from stage $p8$. The signal $+n\overline{G}9$ is down for so long as at least one pulse generated by the pulse generators is still alive, consistent with the logical "or" function that the positive "or" gate Op10 is called on to perform. In the down condition, the signal $+n\overline{G}9$ inhibits transmission of the n89 signal by the positive "and" gate An9, consistent with the logical function of the latter.

Referring again to FIG. 1a, the $n\overline{G}9$ signal is illustrated as being down for the cumulative duration of all the pulse signals, that is from the initiation of the p01c signal to the termination of the p89c signal. The necessity of the overlap of successively generated pulse signals is now clear; this is to assure that the $+n\overline{G}9$ signal shall not come up until the n89 signal has undergone its change. Hence, only valid, final results are gated into the block An9. It should be noted that the pulse generator Pn9 and its bipolar output signals p89c are not necessary for this purpose, and could be omitted, since the bipolar signals p67c (from pulse generator Pn7) span the delay (of the stages n7 and p8) to inducing the change in the n89 signal. This is especially so because the block Op10 delays the coming up of the $+n\overline{G}9$ signal by its own inherent delay. The pulse generator Pn9 has been included to emphasize the underlying principle of the invention.

In the example so far described, the $n\overline{G}9$ signal was down, and therefore gate An9 was closed, for the full cumulative delay time of the logical system (plus the pulse time of generator Pn9). This is because of the assumption that all the signals in the logical chain, or at least all the "n" signals therein, underwent a change upon initiation of the +nG signal. More generally, however, the $+n\overline{G}9$ signal will be down only for so long as is necessary for the signal n89 to be valid, final information. For example, consider the other extreme, where upon initiation of the +nG signal none of the logical stage signals undergoes any change. In this instance, only the pulse generator Pn1 will produce its output pulses; the signal $+n\overline{G}9$ will be down only for so long as the p01c pulse is present, and the n89 signal will be admitted by the gate An9 as soon as the p01c pulse is terminated, or more accurately, as soon as the $n\overline{G}9$ signal comes up on termination of the p01c signal. Thus, as an approximate rule of thumb, the n89 signal will be admitted to the gate An9 two "worst" delay times of the blocks subsequent to the last of the changes in the input signals applied to the "n" blocks.

The described novel timing-gating system for multistage asychronous logic is seen to be flexible in regard to gating in valid final results. The delay to admission of the final output signal is made variable in accordance with the time required for finality of the output signal in any given logical operation. The delay is therefore minimized. It could be further reduced by introducing further pulse generators excited by the "p" signals. This would entail addition of a negative, "n" type "or" gate to correspond to the block Op10 and conversion means to introduce the output of such additional "or" gate as a further input to the block Op10. This would not be warranted, especially since the conversion means would reintroduce the delay of one stage that could be saved by providing the additional circuitry.

Before describing the systems of the FIGS. 2 and 3, a description of the circuits of the logical blocks used therein is in order, and will now be given. FIG. 4 illustrates circuitry which serves as a positive "and" gate, An, if emphasis is on the transmission of positive signals, or as a negative "or" gate, —On, if emphasis is on the transmission of negative signals. The circuit receives a plurality of input signals; only two are shown, namely, n1 and n2, and these may be considered as positive signals for purposes of "and" function and negative signals for purposes of "or" function. The input signal levels are either —0.5 volt or +0.5 volt, as in the case of the Pn circuits. The input signals are applied through respective 82 ohm resistors to the bases of pnp transistors Q1 and Q2, whose emitters and collectors are commoned. The emitters are further commoned to the emitter of a further pnp transistor Q11, and are connected through a 4500 ohm resistor to the +30 volt source. Emitter and collector current again flows in that transistor whose base is most negative. When the signals n1 and n2 are both up at +0.5 volt, the base of Q11 is most negative, as it is returned to 0 volts (ground) through an 82 ohm resistor. Its collector will be at the higher, conducting potential of —5.5 volts, to produce the in-phase output signal +p1. The collector potential is set by means of a coupling network to be proper for application to the base of an npn transistor. The coupling network includes a voltage divider comprising a resistor 2000 and a resistor 187, whose non-common ends are connected to a —12 volt source and to a —6 volt source respectively. Their common ends are connected to the collector through a peaking inductance 1.5.

When either n1 or n2 is down at —0.5 volt, Q1 or Q2 will conduct to the exclusion of the remaining transistors, +p1 will assume the non-conducting potential of —6.5 volts, and the out-of-phase signal —p1 will rise to the conducting potential of —5.5 volts. The coupling network for the transistors Q1 and Q2 is identical to that of transistor Q11, so that the non-conducting potential for —p1 is likewise —6.5 volts. When both n1 and n2 are down, still only one of the transistors will conduct, namely that which tends to conduct more readily. It is immaterial for purposes of the logical function whether Q1 or Q2 will conduct; in either case —p1 will assume the proper potential of —5.5 volts. If further input signals are to be accepted, further transistors would be shunted across Q1 and Q2, emitters tied to emitters, and collectors to collectors, and the individual input signals would be applied through respective 82 ohm resistors to the bases.

Figures 4A, 4B:
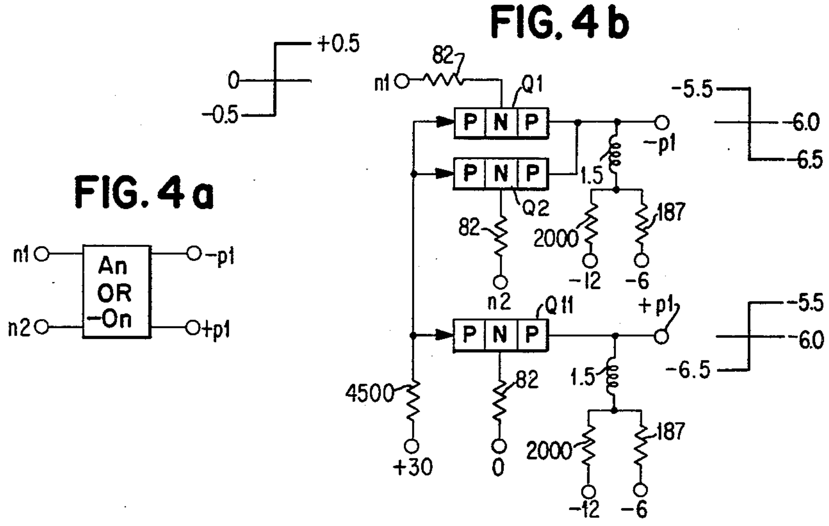
Figure 5A:
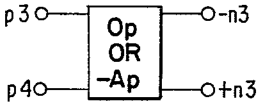
FIG. 5 is an illustration of a positive "or" circuit (equivalent to a negative "and" circuit)
Figure 5B:
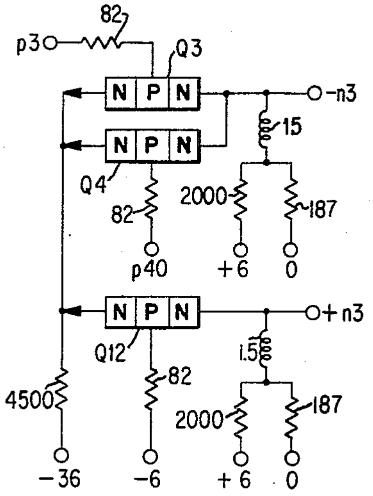

The circuit of a positive "or" gate Op, which is equivalent to a negative "and" gate —Ap, is shown in FIG. 5. The equivalent of "and" and "or" functions shall be taken into account in construing the claims. The circuit of FIG. 5 is "complementary" to that of FIG. 4, in the sense that pnp transistors are replaced by npn transistors, and in the change of supply voltages. The remaining circuit components are the same as in FIG. 4. More particularly, the emitter resistor 4500 is returned to a —36 volt, the base resistor 82 of the "reference" transistor Q12 (corresponding to Q11 of FIG. 4) is returned to the —6 volt source, the 2000 ohm resistors in the coupling networks are returned to +6 volts, and the 187 ohm resistors to 0 volts (ground). The level of the input signals is either —6.5 volts (non-conducting transistor) or —5.5 volts (conducting transistor). The levels of the output signals are respectively +0.5 volt and —0.5 volt. It is seen that "n" blocks accept signals at the level provided by "p" blocks, and deliver signals at levels acceptable by "p" blocks, permitting direct inter-block coupling. When both input signals p3 and p4 are down, the in-phase output signal +n3 will be down and the out-of-phase output signal —n3 will be up. The output signals will reverse in polarity when one or the other, or both, input signals are up. A positive p3 signal will render transistor Q3 conductive to the exclusion of the others; similarly, for positive p4 as applied to its transistor Q4. With both p3 and p4 positive, still only one of Q3 and Q4 conducts; which one is immaterial for fulfillment of the logical function. With p3 and p4 both negative, transistor Q12 conducts to the exclusion of the others. Again, additional transistors may be shunted across Q3 and Q4 to accept additional input signals.

Figure 7A:
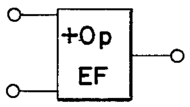
FIG. 7 is an illustration of an emitter follower type "or" circuit capable of accepting output signals from a pnp transistor block and of delivering input signals to an npn transistor block.
Figure 7B:
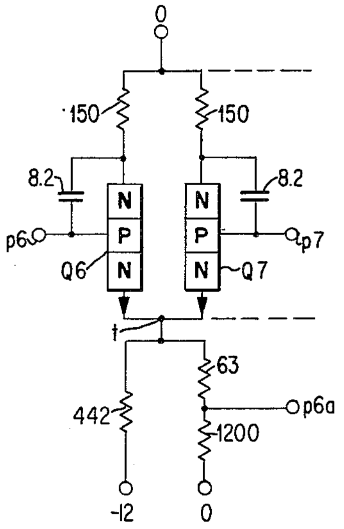

The circuits of FIGS. 4 and 5 are "switching" or "translating" circuits in the sense that "n" blocks receive "n" signals and delivery "p" signals, and "p" blocks accept "p" signals and deliver "n" signals. By way of contrast, the emitter-follower type positive "or" circuit OpEF of FIG. 7 accepts and delivers "p" signals. The input signals $p6$ and $p7$ are applied to the bases of npn transistors Q6 and Q7 respectively. Their collectors are connected through respective 150 ohm resistors to 0 volts (ground). A stabilizing capacitor 8.2 interconnects the collector and base of each transistor. The emitters are tied to a tap point $t$ of a voltage divider, that includes a resistor 442 connected from the −12 volt source to the tap point $t$, a 63 ohm resistor connected from point $t$ to the output signal terminal $p6a$, and a 1200 ohm resistor connected from terminal $p6a$ to 0 volts (ground). Additional signals may be received at the bases of additional transistors, placed with associated 150 ohm resistors and capacitors 8.2 across tap point $t$ and ground in the same manner as Q6 and Q7. The circuit functions in well-known manner; with all input signals at the lower potential of −6.5 volts, the output signal p6a will be at −6.5 volts; when one or more input signals rise to −5.5 volts, the output signal will rise to this value. Thus, the emitter follower "or" circuit delivers but a single in-phase output signal.

Figure 8A:
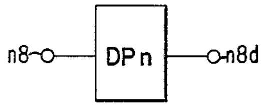
FIG. 8 is an illustration of a power driver circuit capable of accepting output signals from an npn transistor block and of delivering input signals to a pnp transistor block.
Figure 8B:
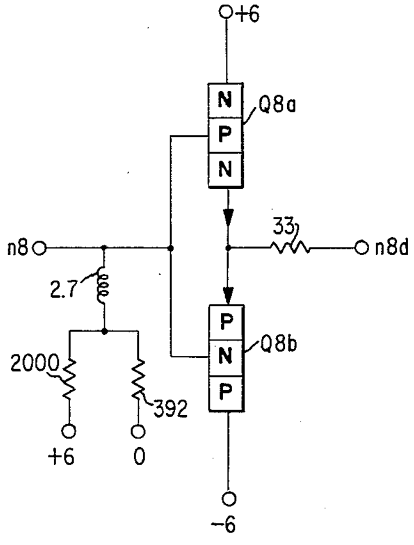
Figure 9A:
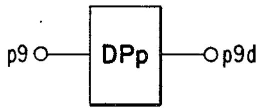
FIG. 9 is an illustration of a power driver circuit capable of accepting output signals from a pnp transistor block and of delivering input signals to an npn transistor block.
Figure 9B:
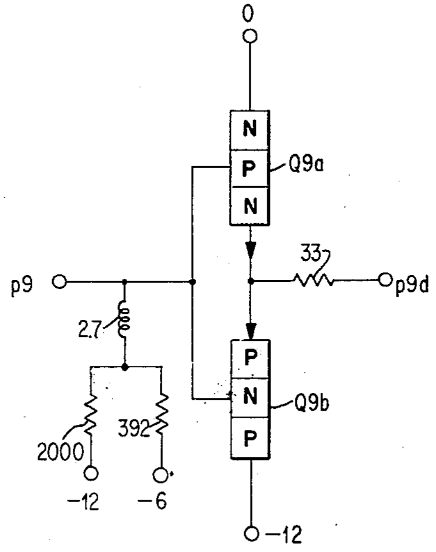

FIG. 8 illustrates a power driver circuit suitable for accepting and delivering "n" signals, and therefore designated DPn. The power driver is a power amplifier adapted to provide base drive for a plurality of pnp transistors. Reference is made to FIG. 5 and the collector coupling networks shown therein. Where the output of an "n" block is intended to serve as input for a power driver, the coupling network undergoes a slight change to that shown in FIG. 8. The inductance 1.5 is replaced by an inductance 2.7, and the 187 ohm resistor is replaced by a 392 ohm resistor. The input signal $n8$ is applied to the commoned bases of an npn transistor Q8$a$ and of a pnp transistor Q8$b$. The emitters of these transistors are also commoned and provide the single in-phase output signal $n8d$ through a 33 ohm resistor. The collectors of the transistors are tied to the +6 and −6 volt supplies directly. The corresponding "p" type power driver DP$p$ of FIG. 9 differs only in the respect of requiring different bias supply voltages, these being 0 volts for the collector of npn transistor Q9$a$, −12 volts for the pnp transistor Q9$b$ and for the coupling nework resistor 2000, and −6 volts for the coupling network resistor 392.

It should be understood that the aforementioned values of the circuit components, supply voltages and signal levels are merely representative. They may be altered as convenient or necessary for the particular transistor type chosen.

The invention will now be explained as applied to the one stage static binary adder illustrated in FIG. 2. The adder may be conveniently divided into three blocks, the adder 100 proper, an escapement gate type register 101 for storing the sum computed by the adder 100, and a gate generator 102. The escapement gate 101 is of the type more fully described and also claimed in my copending application for "Data Latching Systems," Ser. No. 6,388, filed February 3, 1960. The escapement gate functions to clear the sum last stored in a flip flop 103 contained within the escapement gate and at the same time setting in the new sum. In accordance with the stated objects of the invention, the old sum is not cleared and the new sum is not set in until all temporary addition results have vanished and the sum available for setting in is truly the final result. The gate generator 102 is responsible for preventing insertion of spurious results into the register. It includes a plurality of pulse generators of the P$n$ type, which as in FIG. 1 generate pulse signals effective to block premature register insertion. The pulse signals are generated in response to signal changes in several strategic blocks in the adder 100. The adder and escapement gate share blocks A$n$31, A$n$32 and O$p$41 in common, thus avoiding unnecessary duplication. That is, the adder would be a complete adder if it included but the blocks A$n$31, A$n$32 and O$p$41 considered as parts of the escapement gate with the remainder of the escapement gate omitted. Similarly, the escapement gate would be a complete escapement gate if it included but the blocks A$n$31, A$n$32 and O$p$41 considered as part of the adder with the remainder of the adder omitted.

The adder 100 is of conventional construction and as such includes a "half-adder" composed of "and" gates A$n$11, A$n$12, A$n$13 and "or" gate O$p$21. It accepts addend input bit signal A and augend input bit signal B, these signals being of the "n" type and being provided in complementary pairs. The adder can also function as a subtractor, provided the augend B signal is replaced by a subtrahend complement B signal. Therefore, it is intended that the term "adder" be construed as adder or subtractor or adder-subtractor in the proper context of the claims.

In line with conventional terminology, a statement that the A signal or A bit is present, means the addend A has a value of binary one, and absence of the A bit or presence of the A complement ($\overline{A}$) means that the addend A has a value of binary zero. Similarly generation of the half or full sum or of a carry means that the half or full sum or carry has a value of binary one. Generation of the corresponding complements means that the sum or carry has a value of binary zero.

The $n$A and $n\overline{B}$ signals are applied to the "and" gate A$n$11, whereas the $n\overline{A}$ and $n$B signals are applied to "and" gate A$n$12. The gates deliver mutually exclusive output signals $p$A.$\overline{B}$ (A and not B) and $p\overline{A}$.B (not A and B). The output signals serve as input signals to "or" gate O$p$21, which accordingly delivers the half-sum signal $n$HS in complementary pairs. The half-sum is generated if either the A bit or the B bit is one, but not both. The $n$A and $n$B signals are also applied to the "and" gate A$n$13, which delivers output signal $p$CG (generated carry). The carry is generated only if both the A and B bits are one. The half-adder thus obeys the rules of binary arithmetic.

To form the full sum, the carry input from the immediately preceding stage must be taken into account. The carry input is in the form of the input signal $n$CI, which is provided in a complementary pair. The $n$CI and $n\overline{HS}$ signals are applied to "and" gate A$n$31, and the $n\overline{CI}$ and $n$HS signals are applied to the "and" gate A$n$32. Gates A$n$31 and A$n$32 also receive a −$n$SF signal, which may be disregarded for the time being, that is considered disconnected. Accordingly, the gates deliver output signals $p$CI.$\overline{HS}$ and $p\overline{CI}$.HS. These output signals are mutually exclusive in the sense that necessarily they cannot be present simultaneously, although they may be absent concurrently when neither the half-sum or the carry-in are formed. The description of the present invention has been in terms of voltage logic; actually the treatment of transistor circuitry is better in terms of current logic. Noting (see FIG. 4) that presence of a "p" signal concurs with flow of "p" current, and absence of the "p" signals concurs with absence of the "p" current, it is seen that the signal lines $p$CI.$\overline{HS}$ and $p\overline{CI}$.HS may be and in fact are tied together, since current can flow in at most one of the lines, if at all, but not both, at a time. The two signals thus form a single sum signal, $p$S, which is applied to "or" gate O$p$41. The $p$SN signal, which is also applied to gate O$p$41, may be disregarded for the time being, that is treated as disconnected in the same manner as the −$n$SF line as applied to gates A$n$31 and A$n$32. Accordingly, the gate O$p$41 delivers the sum signal $n$S in a complementary pair. The sum is thus formed if one and only one of the addend, augend and carry-in are present, or all three are present, in accordance with the well-known rules of binary addition.

The $n$HS and $n$CI signals are also applied to "and" gate A$n$33, which delivers a propagated carry output signal $p$CP. The propagated carry is thus formed if a carry input is present and a half-sum is formed. Stated another way, the propagated carry is formed if a carry input is present and either the A bit or the B bit is one. The *p*CP and *p*CG signals are applied to "or" gate O*p*42, which accordingly delivers a carry-out signal *n*CO in a complementary pair. The *n*CO signals serve as carry-input signal for the next higher adder stage. The carry-out is generated if at least two of the A, B and the carry-in bits are one, in accord with the rules of binary addition.

The $nH\overline{S}$, $n\overline{S}$ and $n\overline{CO}$ signals are also applied to the gate generator 102, more particularly to the pulse generators P*n*2, P*n*3*a*, and P*n*3*b* respectively, for formation of output blocking pulses *p*HS*c*, *p*S*c*, *p*CO*c*, generated in bipolar pairs, along the same lines described for the circuit of FIG. 1. The latter pairs of signals are applied to an emitter follower "or" block O*p*EF 82, which produces output signal *p*AD*c* (change in the adder) for so long as any of the pulses produced by the pulse generators are still alive, since one positive (and one negative concurrent) pulse is produced by each pulse generator respectively in response to change in the level of the half-sum signal, the sum-signal, and the carry-out signal, irrespective of the direction of the change.

The *p*AD*c* signal is applied to an "or" gate O*p*84, which also receives a positive pulse input signal *p*ST*c* from a pulse generator P*n*1 in response to a positive starting signal *n*ST applied thereto. The starting signal is generated at the start of each addition cycle. It is assumed, that changes in the A and B signal occur, if at all, substantially concurrently with the initiation of the *n*ST signal. The pulse generator P*n*1 is seen to be functionally equivalent to the like-labeled pulse generator of FIG. 1. Further, the combination of "or" gates 82 and O*p*84 is seen to be functionally equivalent to the "or" gate O*p*10 of FIG. 1. Two "or" gates are provided here, because of the loading requirements, especially where a multi-stage adder is used, as will be explained with reference to FIG. 3. For the same reason of loading requirements, the inhibiting signal $n\overline{G}$ is not formed directly as the output of gate O*p*84; instead, the out-of-phase output signal $n\overline{G}a$ of block O*p*84 produces the $n\overline{G}$ signal through the agency of the power driver DP*n*85. The $n\overline{G}$ signal is analogous to the like-named signal of FIG. 1. It is applied to an "and" gate A*n*51, which also receives the sum signal *n*S, gate A*n*51 is, therefore, analogous to gate A*n*9 in the sense that gate A*n*51 will not transmit the sum signal until the sum is valid information, more particularly not until the half-sum, sum and carry-out results have stabilized.

As a matter of fact, the desired objective of transmitting only valid results has not been completely attained. Consider the situation where the last previous addition has been long completed with a sum bit of one having been formed. The *n*S and $n\overline{G}$ signals will both be up, and hence the output of gate A*n*51 will be up to signify the sum bit one. In the new addition, there is to be no change in the A, B and CI bits, hence no change in the adder. Nevertheless, the *n*ST signal initiating the new addition will cause the $n\overline{G}$ signal to go down, and therefore the output of gate A*n*51 to go down, thereby temporarily falsely reflecting a sum bit of zero. The gate A*n*51 by itself has no memory property, which is obviously needed to prevent the just described spurious result. The memory is provided by the full escapement gate circuitry, which will now be described.

The output signal of the gate A*n*51 is the aforementioned *p*SN (set on) signal. This is applied to "or" gate O*p*41 as previously stated, also to an "or" gate O*p*53 within the flip flop storage unit 103, and to a negative "and" gate —A*p*52. Gate —A*p*52 also receives the *p*S signal and a $-p\overline{G}$ signal which is essentially the same as the $n\overline{G}$ signal except for the opposite sign and for its "p" rather than "n" type. The $n\overline{G}$ and $-p\overline{G}$ signals are present and absent substantially concurrently. This follows at once from the derivation of the $-p\overline{G}$ signal, presently described.

The in-phase output signal $-n\overline{G}a$ of "or" gate O*p*84 is applied as the sole input signal to the negative "or" gate —O*n*86, which produces output signal $-p\overline{G}b$ in response. The gate —O*n*86 thus serves solely for the purpose of converting the "n" input signal to a "p" output signal. The $-p\overline{G}b$ signal is applied to a power driver D*p*87, which produces the $-p\overline{G}$ signal. The power driver is provided because of loading requirements, especially in the case of a multistage adder as described in FIG. 3.

Gate —A*p*52 produces the aforementioned —*n*SF (set off) signal, which is applied to gates A*n*31 and A*n*32 as previously stated; also to "and" gate A*n*54 contained within the flip flop storage 103. Gate A*n*54 also receives signal *n*SB (sum bit) from gate O*p*53, and delivers in-phase output signal *p*SB to gate O*p*53 and out-of-phase output signal —*p*SB to a negative "and" gate —A*p*55 which gates out the sum bit in the form of bipolar output signals *n*SBO (sum bit out) in response to application of an output gating signal —*p*OG derived from suitable means in the computer (not shown).

The escapement gate exclusive of flip flop 103 and gate —A*p*55 has memory in view of the feedback of the signals —*n*SF and *p*SN. Ordinarily, the state of a memory circuit is not uniquely determined by the date of its input signals alone, but depends on its past history. However, it turns out here that the state of the signals *n*CI and *n*HS does determine uniquely the state of the escapement gate as a consequence of the action of the pulse generators. This may be seen by considering the chain of events in the two possible cases of forming (1) the sum bit of one and (2) the sum bit of zero, that is the two cases where, except for the possible effect of the —*n*SF signal, the *p*S signal would be respectively up and down. Considering the case (1) as a consequence of the commencement of the *n*ST signal, the $n\overline{G}$ signal will come down and the $-p\overline{G}$ signal will come up. If the *p*SN signal was not previously down, it will come down now as a consequence of the change in state of the $n\overline{G}$ signal. Similarly, if the —*n*SF signal was not previously up, it will come up now as a consequence of the change in state of the $-p\overline{G}$ signal. If the *p*S signal was not previously up, it will come up as a consequence of the change in state of the —*n*SF signal. The *n*S signal, if not previously up, will come up now. It is important to note that the new coming up of the *n*S signal would cause the pulse generator P*n*3*a* to produce *p*S*c* blocking pulses now, that is after delay through the stages —A*p*52, A*n*31 or A*n*32, O*p*41 and P*n*3*a*. This delay in itself was preceded by delay through the stages P*n*1, O*p*84, —O*n*86 and DP*p*87. The delay to the generation of the *p*HS*c* signals by pulse generator P*n*2 is through only three stages, namely A*n*11 or A*n*12, O*p*21 and P*n*2. Hence the pulses *p*HS*c* must be of substantially longer duration than two to three "worst" delay times. More will be said about this point later.

With the *n*S signal newly or previously up, the —*n*SF signal will remain up to sustain the *p*S signal even when the $-p\overline{G}$ signal does down again upon termination of pulse generation of the gate generator, which includes the pulse generator P*n*1 in the present and similar contexts. Such termination of pulse generation also pro- the $-p\overline{G}$ signal goes down again upon termination of come up. There are no further changes in the signals so far considered. However, the flip flop 103 will now newly or continually store binary one. With the *p*SN signal up, the *n*SB signal if not previously up, will now come up. Therefore, the *p*SB signal, if not previously up, will come up now.

Consider now case (2), namely, the formation of a zero sum bit, that is the *p*S signal is down independently of the state of the —*n*SF signal. The *p*S signal will be necessarily down. With the change in the states in the $n\overline{G}$ and $-p\overline{G}$ signals due to commencement of a new transient or blocking cycle by virtue of initiation of the signal *n*ST, the *p*SN signal and the —*n*SF signal will newly assume their "off" or "absent" states, unless previously therein. Unless previously down, the *n*S signal will come down. There will be no further effects until the $n\overline{G}$ and $-n\overline{G}$ signals recover, at which time the —*n*SF signal will come down and no further changes will take place among the signals so far considered. The flip flop will now newly or continually store binary zero. With the —*n*SF signal down, the *p*SB signal will be down. With the *p*SN and *p*SB signals down, the *n*SB signal will be down.

Thus, under steady-state conditions the state of the entire escapement gate 101 is uniquely determined. The bipolar output signals *n*SBO reflect the state of the flip flop upon application of the —*p*OG signal, and may be used externally of the adder when so gated out. It remains to be shown that the flip flop 103 will store the last previous result until the transient cycle is complete, and only then can experience a change in state if such is called for by the new addition.

At demonstrated in the two examples above, in the steady state, that is at the end of the transient cycle, the *p*SN, —*n*SF, *p*SB, *n*SB signals will all be up if the sum is one, and will all be down if the sum bit is zero. Hence, the flip flop will experience a change in state, if at all, upon change of the *p*SN or —*n*SF signals. Four cases arise:

(3) The last previously stored sum bit is one and the new sum bit is also one.
(4) The last previously stored sum bit is one and the new sum bit is zero.
(5) The last previously stored sum bit is zero and the new sum bit is also zero.
(6) The last previously stored sum bit is zero and the new sum bit is one.

Cases (3) and (6) can be considered together by reverting the consideration of case (1) above. The first instance of possible change in the *p*SN or —*p*SF signals occurred when the $n\overline{G}$ signal went down and the $-p\overline{G}$ signal went up. At this instance, there is no change in the *n*SB and *p*SB signals in either case (3) or case (6). In case (3) the previously up —*n*SF signal stays up, but the previously up *p*SN signal comes down. Nevertheless, the previously up *p*SB signal is sufficient to keep "or" gate O*p*53 open. Therefore, the *n*SB signal remains up, and with the —*n*SF signal still up, the *p*SB signal remains up. In case (6) the previously down *p*SN signal remains down and the previously down —*n*SF signal comes up. Since there is no change in the input signals to gate O*p*53, at least not immediately, the *n*SB signal remains down and hence the *p*SB signal remains down. Hence there is no change in the flip flop state in this first instance of change of the *p*SN and —*n*SF signals of case (1).

The next instance of change in the *p*SN and —*n*SF signals in case (1) occurred with the recovery of the $n\overline{G}$ and $-p\overline{G}$ signals at the end of the transient cycle. The —*n*SF signal remained up, whereas the *p*SN signal newly came up. This is of no further consequence in case (3), as the *p*SB and *n*SB signals had been up throughout. In case (6), the result is the coming up of the *n*SB signal, which together with the "up" —*n*SF signal causes the *p*SB signal to come up. Therefore, binary one either stays stored throughout the transient cycle (case (3)), or is initially inserted at its end (case (6)).

Cases (4) and (5) can be considered together by reverting to the consideration of case (2) above. Again there are two instances of changes in the *p*SN and —*n*SF signals. As a consequence of the "off" state of the $n\overline{G}$ and $-p\overline{G}$ signals at the start of the transient cycle, in case (4) the *p*SN signal came down while the —*n*SF signal stayed up, and in case (5) the *p*SN signal stayed down and the —*n*SF signal came up. The flip flop 103 is not affected in either case; in case (4) the previously up *p*SB signal maintains the *n*SB signal up, which in turn maintains the *n*SB signal up; in case (5) the previously down *n*SB signal maintains the *p*SB signal down, which together with the down *p*SN signal maintains the *n*SB signal down. The second instance of change in the *p*SN and —*n*SF signals was at the termination of the transient cycle, when the $n\overline{G}$ and $-p\overline{G}$ signals resumed their "on" states. In both cases (4) and (5), the *p*SN signal stayed down while the —*n*SF signal newly came down. In case (4) the *p*SB signal and hence also the *n*SB signal came down. In case (5) these signals retained their previous down states.

Thus, it is seen that the result of the previous addition stored in the flip flop 103 is changed, if at all, when the $n\overline{G}$ and $-p\overline{G}$ signals recover their "on" states, that is after all gate generator transient pulses have terminated. Hence no temporary results are stored in the flip flop. This will now be fully apparent upon describing the operation of the complete adder. The case of a previous addition of the A bit zero to the B bit zero, followed by a new addition of the A bit one to the B bit zero, with the carry-in and carry-out bits zero in both additions, merits first consideration. This is because it points up to the necessity for making the *p*ST*c* and *p*HS*c* pulses longer than the two to three "worst" delay times required in the serial logical chain of FIG. 1. The *p*S*c* pulse may be two to three delay times, say 2.5 delay times. On this basis, it turns out that the *p*ST*c* pulse should be 3.5 delay times and the *p*HS*c* pulse 5.5 delay times. The longer delays can be achieved by increasing the number of inductance-capacitance sections in the networks PF of FIG. 6*b*. The example will be described with reference also to FIG. 2*a*.

Figure 2:
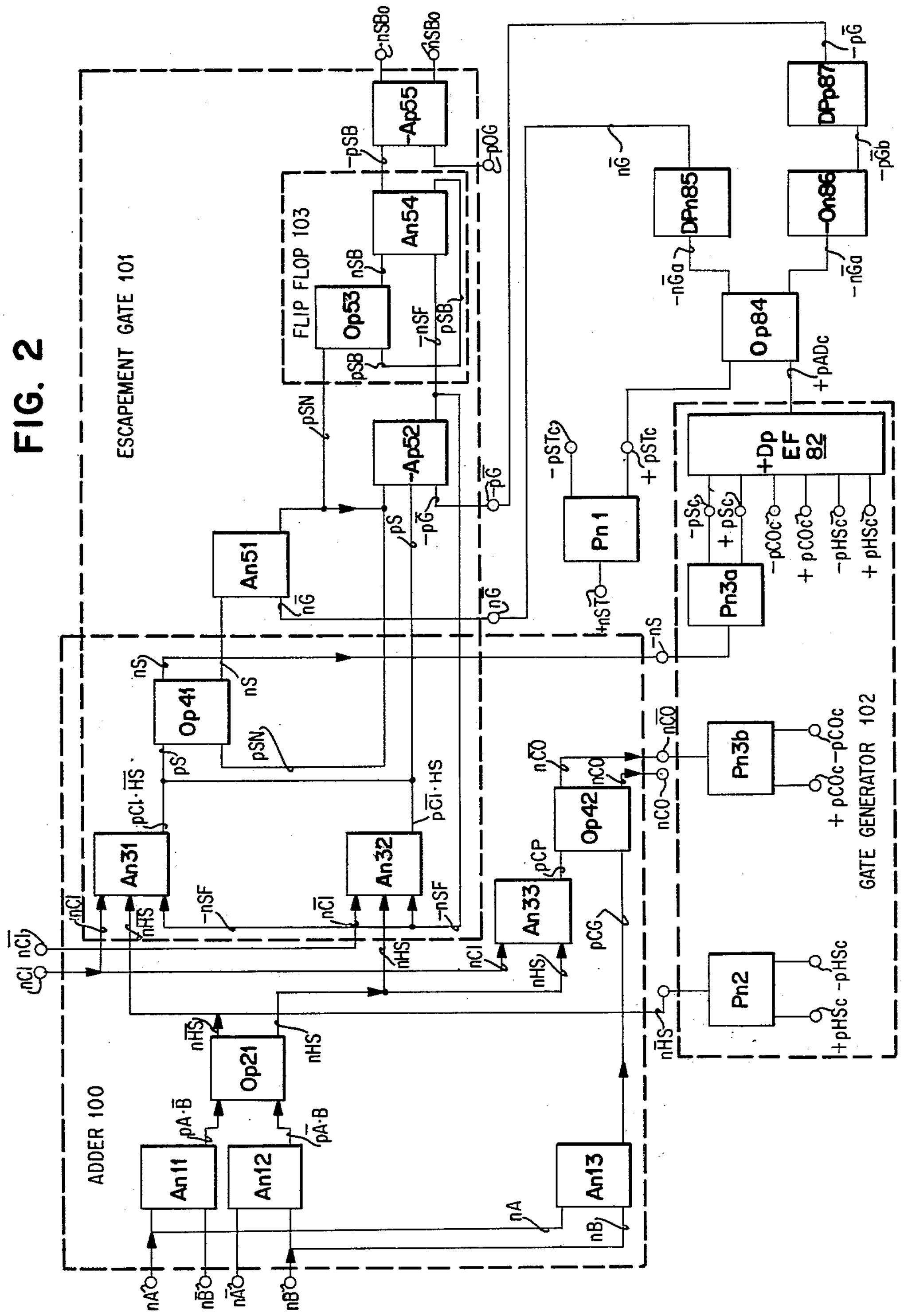
Figure 2A:
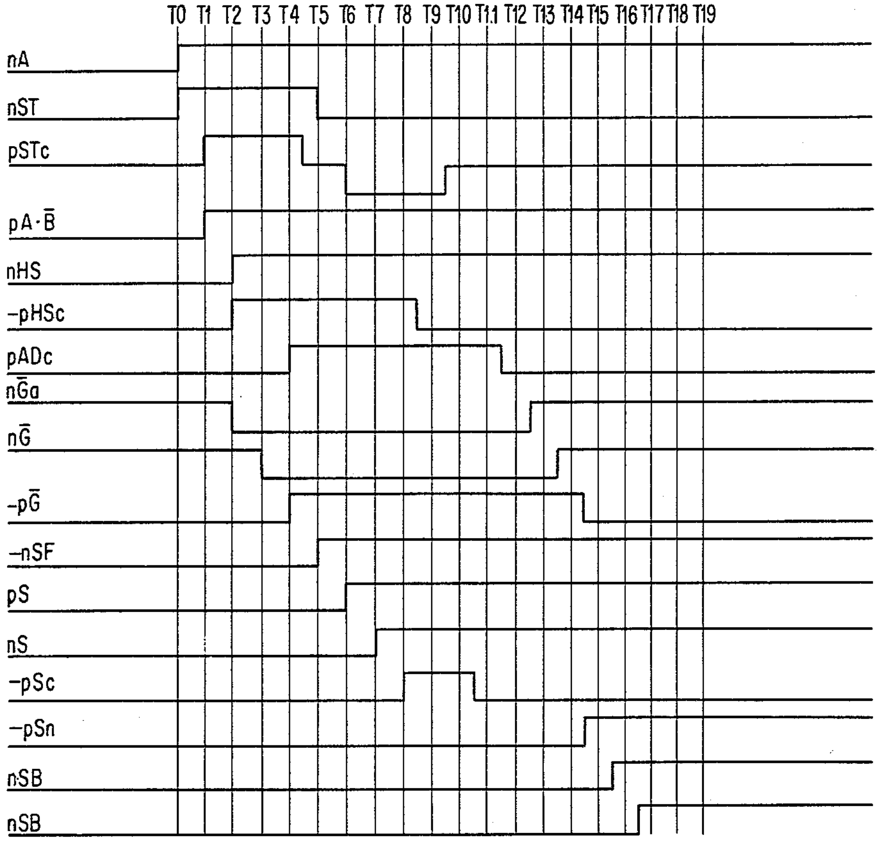

For simplicity of explanation, it will be assumed that each block of FIG. 2 has an inherent time delay of one unit. This includes logic as well as pulse generators. The time increments of FIG. 2*a* are in units of inherent time delay. The circuit of FIG. 2 is assumed to be in a steady-state condition prior to T0 with the A, B, CI, CO, HS and S bits all zero. At the time T0 the start signal is given for a new addition and at the same time the A bit changes to one. Since the B bit remains zero, it is not shown in FIG. 2A. The same is true of the CI and CO bits. Where signals are generated in concurrent pairs of opposite polarity, only one signal is shown. The $-p\overline{G}b$ signal is not shown because it concurs with the $n\overline{G}$ signal. The subsequent unit delay times are designated T1, T2, etc.

The *n*ST signal is arbitrarily taken as five units of time long, and therefore terminates at T5. It engenders the positive *p*ST*c* pulse that lasts from T1 (one unit time subsequent to T0) to T4.5. The termination of the *n*ST signal at T5 initiates at T6 a negative *p*ST*c* pulse, also of 3.5 unit times duration. The negative pulse contributes nothing to the addition, but is merely shown for the sake of completeness. The duration of the *n*ST signal is also of no moment; merely its initiation matters. It should be understood, that as in the apparatus of FIG. 1, the *n*ST signal may be a negative signal, in which case the —*p*ST*c* terminal would be connected to the "or" block O*p*84; or the *n*ST signal may be arranged to alternate at the commencement of each new addition, in which case both outputs of the pulse generator P*n*1 would be connected to block O*p*84.

The *p*ST*c* signal initiation produces upon successive unit delays through the stage O*p*84 the "off" $n\overline{G}a$ signals (commencing at T3), through stages DP*n*85 and —O*n*86 concurrently the "off" $n\overline{G}$ and $-p\overline{G}b$ signals (both commencing at T4), and through stage DP*p*87 the "off" $-p\overline{G}$ signal.

The initiation of the *n*A signal at T0 had given rise after delay through A*n*11 to the $p\text{A}.\overline{\text{B}}$ signal which commenced at T1 concurrently with the *p*ST*c* signal. The $p\text{A}.\overline{\text{B}}$ signal gives rise after delay through O*p*21 to the nHS signal, commencing at T2, so that the —pHSc positive pulse is generated after delay through block Pn2, commencing at T3. The —pHSc positive pulse gives rise after delay through emitter follower "or" block 82 to the pADc signal, commencing at T4. The $n\overline{G}a$ signals can now be sustained in their "off" condition by the pADc signal, so that the pSTc signal may terminate upon overlapping the pADc signal for one-half unit time, at T4.5.

The "off" condition of the $-p\overline{G}$ signal at T4 causes, after delay through block —Ap52, coming up of the —nSF signal at T5. This gives rise after delay through stage An32 to the pS signal, commencing at T6, which in turn gives rise after delay through stage Op41 to the nS signal, commencing at T7. The concurrent change in the $n\overline{S}$ signal, after delay through pulse generator Pn3a, gives rise to the —pSc positive pulse, commencing at T8. The pADc signal can now be sustained by the —pSc pulse, so that the —pHSc pulse may terminate upon overlapping the —pSc pulse for one half unit of time. The —pSc pulse need not be of greater than the 2.5 units of time duration contemplated for the straight serial logic chain of FIG. 1; hence it terminates at T10.5. After successive unit delays through the stages 82, Op84, DPn85 and —On86 (considered concurrently), and DPp87, the pADc, $n\overline{G}a$, $n\overline{G}$ and $-p\overline{G}b$ (considered concurrently), and $-p\overline{G}$ signals reassume their initial states at T11.5, T12.5, T13.5 and T14.5 respectively. The coming up of the nG signal at T13.5 gives rise, after delay through stage An51, to the pSN signal, commencing at T14.5. The pSN signal, after successive delays through stages Op53 and An54, gives rise respectively to the nSB and pSB signals, which commence at T15.5 and T16.5 respectively.

The case of a previous addition of one to zero, followed by a new addition of zero to zero, with the carry-in and carry-out bits zero in both additions, is somewhat simpler. Here the nA, $pA.\overline{B}$ and nHS signals would experience changes also at T0, T1 and T2 respectively, but of inverse nature. The transient signals pSTc, pHSc (here the +pHSc signal), pADc, $n\overline{G}a$, $n\overline{G}$ and $-p\overline{G}$ signals would commence at the same respective times as shown in FIG. 2a. In fact, the pulse signals pSTc and pHSc signals would have exactly the same wave shape respectively as shown in FIG. 2A. However, the pS signal would come down following the nHS signal after delay through block An31, at T3. Since the $n\overline{G}$ signal also comes down at T3, the pSN signal would come down after delay through block An51, at T4, at which time the $-p\overline{G}$ signal comes up to sustain the —nSF signal up, maintaining flip flop storage of one. The coming down of the pSN signal produces, after delay through block Op41, the coming down of the nS signal at T5. This induces, commencing at T6 the +pSc positive pulse, which lasts until T8.5, so that the pHSc and pSc pulses terminate concurrently. Therefore, the pADc, $n\overline{G}a$, $n\overline{G}$ and $-p\overline{G}$ signals reassume their initial states at T9.5, T10.5, T11.5 and T12.5 respectively. The —nSF, pSB and nSB signals come down at T13.5, T14.5 and T15.5 respectively.

Successive additions of non-changing A and B bits with zero carry-in and carry-out bits are particularly simple; they entail generation of but the pSTc pulse and the transient cycle affects only the $n\overline{G}a$, $n\overline{G}$, $-p\overline{G}$ and either the pSN or —pSF signals, with the stored sum in the flip flop left unaffected. Similarly, the change of both A and B bits in the new addition, still assuming zero carry-in introduces at most as an added factor a generation of termination of a carry-out, with the attendant generation of the pCOc pulse beginning at T3, but the pulse generators Pn2 and Pn3a do not generate pulses, since the half and full sums do not experience a change in states. Since the carry-out bit serves as the carry-in bit of the next stage, where it may give rise to a full sum in the absence of a locally generated half sum, the pCOc signal should have the same duration as the pHSc signal, namely 5.5 units of delay.

Figure 3:
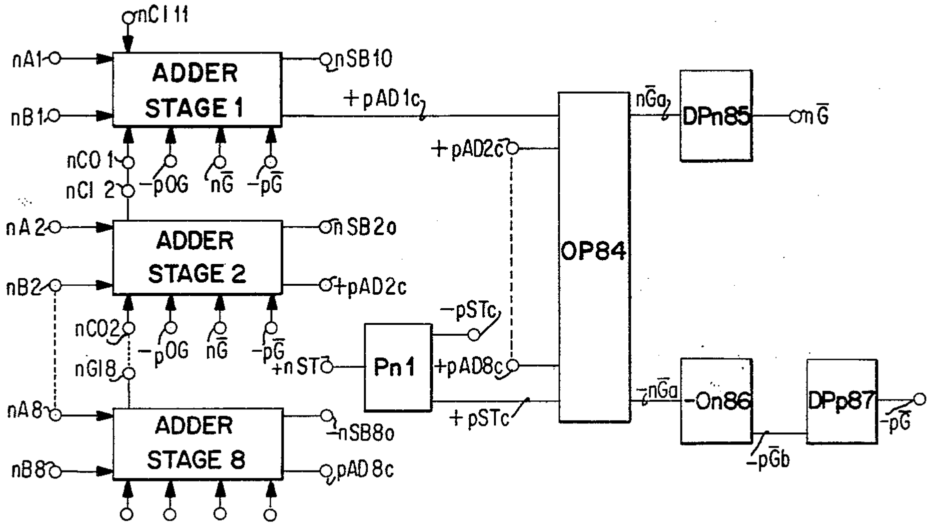

Deferring further consideration of the effect of changes in the carry-in bit for FIG. 3, and still assuming that it remains at zero, there remains the case of a previous addition of zero and one followed by a new addition of one and one, and the converse case. These cases involve respectively generation and termination of a carry-out; in this respect they are similar to the case described in the preceding paragraph. Otherwise they are similar respectively to the previously described previous addition of one and zero followed by the new addition of zero and zero, and the previously described converse case. A further description is considered unnecessary.

FIG. 3 illustrates a multidenominational static parallel adder-substracter. By way of example, it is assumed that the adder has a capacity of eight bits. It is composed of eight adder stages of the type illustrated in FIG. 2. Only the least significant, second least significant and most significant denominational stages are illustrated explicitly, the others being indicated symbolically by vertical lines. Each adder stage 1, 2, etc., includes an adder 100, an escapement gate 101 and a gate generator. The stages received addend, augend carry-in, carry-out and sum-bit-out signals of the character described in connection with the description of FIG. 2. To differentiate between the corresponding signals of the several stages, the respective numerals 1, 2, etc., appear as suffixes to the signals. These signals appear in complementary pairs; however, for simplicity only the principal signal is indicated.

The pADc signals are also individual to each stage, and are therefore designated as pAD1c, pAD2c, etc. The —pOG, $n\overline{G}$ and $-p\overline{G}$ signals are common to all stages. The "or" block Op84 receives the +pSTc signal generated as previously described; it may instead receive the —pSTc signal or both pSTc signals according to the previously described alternatives. Additionally it receives the eight pADc signals. The $n\overline{G}$ and $-p\overline{G}$ signals are obtained as in FIG. 2.

The carry-out signal of each stage except the last stage serves as the carry-in signal of the next following stage. The carry-out signal of the last stage may be applied to an over-flow-unit (not shown) for storage in the case of addition if desired, and for deletion in the case of subtraction. Stage 1 also receives the nCI complementary pair signals; the carry-in bit is zero in the case of addition and one in the case of subtraction. Subtraction is accomplished by forming the subtrahend-complement as the B signals, which are added to the A minuend signals. External means (not shown) make the decision whether to add or subtract.

The operation of the multi-stage adder will be understood by first considering examples of propagating a change in the carry-in bit through the eight stages. Assume that in the last previous operation 11111111 was subtracted from itself, and in the new operation 00000000 is to be added to 11111111. A and B remain unchanged at 11111111 and 00000000 respectively. The half-sum and generated carry signals remain unchanged at one and zero respectively. The carry-in signals change from one to zero. The overflow carry-out will vanish. Insofar as the first adder stage is concerned, the present example can be explained with reference to FIG. 2a with the understanding, that the nA signal is replaced by an $n\overline{CI}$ signal, the $pA.\overline{B}$ signal by a pCP signal, the nHS signal by an $n\overline{CO}$ signal, and the —pHSc signal by a +pCOc signal. The propagation of the $n\overline{CI}$ signal to the second stage occurs after a delay through stages An33 and Op42, which is the same as through stages An11 or An12 and Op21. Therefore, every subsequent stage will generate its respective $n\overline{CO}$ signal upon a delay of two delay time units subsequent to the generation of the $n\overline{\text{CO}}$ signal of the preceding stage, its respective *p*CO*c* signal after a delay of two units subsequent to the generation of the *p*CO*c* signal of the previous stage, and similarly for the *p*AD*c* signals. Thus the $n\overline{\text{CI}}$ signal of the first stage will propagate itself to the $n\overline{\text{CO}}$ terminal of the last stage after a sixteen unit delay.

The —*n*SF signal will come up in all stages concurrently, namely at T5. At this time, the first, second and third stages will have received their $n\overline{\text{CI}}$ signals, so that the *p*S signals will commence at T6 in these stages. Therefore the *n*S and *p*S*c* signals of the first three stages will commence at T7.5 and T8.5 respectively. The fourth stage will not receive its $n\overline{\text{CI}}$ signal until T6, so that its *p*S signal will come up at T7, its *n*S signal at T8, and its *p*S*c* signal at T9. The *p*S and *p*S*c* signals in each succeeding stage will be delayed by two unit delays with respect to those of the preceding stage. The complete time relations of the eight stages are presented in the following Table I. This table points up to the fact that in the stage 4 and onward the *p*CO*c* and *p*S*c* signals

*Table I*

| Signal | Stage | | | | | | | |
|---|---|---|---|---|---|---|---|---|
| | 1 | 2 | 3 | 4 | 5 | 6 | 7 | 8 |
| *n*ST | T0–T5 | | | | | | | |
| *p*ST*c* | T1–T4. 5 (negative pulse T6–T9. 5) | | | | | | | |
| $n\overline{\text{CI}}$ | T0 | T2 | T4 | T6 | T8 | T10 | T12 | T14 |
| *p*CP (down) | T1 | T3 | T5 | T7 | T9 | T11 | T13 | T15 |
| $n\overline{\text{CO}}$ | T2 | T4 | T6 | T8 | T10 | T12 | T14 | T16 |
| *p*CO*c* | T3–T8. 5 | T5–T10. 5 | T7–T12. 5 | T9–T14. 5 | T11–T16. 5 | T13–T18. 5 | T15–T20. 5 | T17–T22. 5 |
| *p*AD*c* | T4–T11. 5 | T6–T11. 5 | T8–T13. 5 | T10–T15. 5 | T12–T17. 5 | T14–T19. 5 | T16–T21. 5 | T18–T23. 5 |
| $n\overline{\text{G}}a$ (off) | T2–T24. 5 | | | | | | | |
| $n\overline{\text{G}}$ (off) | T3–T25. 5 | | | | | | | |
| $-p\overline{\text{G}}$ (off) | T4–T26. 5 | | | | | | | |
| —*n*SF (up) | T5 (each stage) | | | | | | | |
| *p*S | T6 | T6 | T6 | T7 | T9 | T11 | T13 | T15 |
| *n*S | T7 | T7 | T7 | T8 | T10 | T12 | T14 | T16 |
| *p*S*c* | T8–T10. 5 | T8–T10. 5 | T8–T10. 5 | T9–T11. 5 | T11–T13. 5 | T13–T15. 5 | T15–T17. 5 | T17–T19. 5 |
| *p*SN | T26. 5 (each stage) | | | | | | | |
| *n*SB | T27. 5 (each stage) | | | | | | | |
| *p*SB | T28. 5 (each stage) | | | | | | | |

*Table II*

| Signal | Stage | | | | | | | |
|---|---|---|---|---|---|---|---|---|
| | 1 | 2 | 3 | 4 | 5 | 6 | 7 | 8 |
| *n*ST | T0–T.5 | | | | | | | |
| *p*ST*c* | T1–T4.5 (negative pulse T6–T9.5) | | | | | | | |
| *n*CI | T0 | T2 | T4 | T6 | T8 | T10 | T12 | T14 |
| *p*CP | T1 | T3 | T5 | T7 | T9 | T11 | T13 | T15 |
| *n*CO | T2 | T4 | T6 | T8 | T10 | T12 | T14 | T16 |
| *p*CO*c* | T3–T8.5 | T5–T10.5 | T7–T12.5 | T9–T14.5 | T11–T16.5 | T13–T18.5 | T15–T20.5 | T17–T22.5 |
| *p*AD*c* | T4–T9.5 | T6–T11.5 | T8–T13.5 | T10–T15.5 | T12–T17.5 | T14–T19.5 | T16–T21.5 | T18–T23.5 |
| $n\overline{\text{G}}a$ (off) | T2–T24.5 | | | | | | | |
| $n\overline{\text{G}}$ (off) | T3–T25.5 | | | | | | | |
| $-p\overline{\text{G}}$ (off) | T4–T26.5 | | | | | | | |
| —*n*SF(down) | T27.5 (each stage) | | | | | | | |
| *p*S (down) | T1 | T3 | T5 | T7 | T9 | T11 | T13 | T15 |
| $n\overline{\text{S}}$ | T5 | T5 | T6 | T8 | T10 | T12 | T14 | T16 |
| *p*S*c* | T6–T8.5 | T6–T8.5 | T7–T9.5 | T9–T10.5 | T11–T13.5 | T13–T15.5 | T15–T17.5 | T17–T19.5 |
| *p*SN (down) | T4 (each stage) | | | | | | | |
| *n*SB (down) | T29.5 (each stage) | | | | | | | |
| *p*SB (down) | T28.5 (each stage) | | | | | | | |

commence concurrently. The pCOc signals are of the longer, 5.5 delay time duration; since they overlap, they are sufficient to prevent premature "on" conditions of the $n\overline{G}$ and $-p\overline{G}$ signals, and therefore the storage of unwanted temporary results.

Table II summarizes the system performance for the converse situation, namely a previous addition of 11111111 and 00000000 and a new subtraction of 11111111 from itself. Here too changes occur only in the sum bits (one to zero) and in the carry-in and out bits (zero to one).

Table II is self-explanatory to a great extent; however, the following is noteworthy. The pS signals come down as a consequence of the generation of their respective nCI signals after unit delay through block An32, that is at T1, T3, etc., respectively. The $n\overline{S}$ signals cannot come up until the pSN signal comes down; hence, in the first two stages the $n\overline{S}$ signals come up at T5, in the third stage after a unit delay through block Op41 at T6, and in each of the subsequent stages two delay time units later than in the previous stage. The pSc signals, as a consequence fall within time intervals embraced by their respective pHSc signals, so that overlapping of the pulses is assured. It is apparent that under certain circumstances the pulse generator Pn3a which produces the pSc signal may be omitted.

The considerations governing a change in the state of the generated carry signal are very similar, since such a change also occurs after delay through two blocks, namely block An13 and Op42, subsequent to the initiation of the start signal. Therefore, in a given stage the transient effects of a generated carry would concur with those of a change in the half sum of such stage, whether or not in fact there is such a change in the half sum. A stage subject to change in the carry-in signal cannot sense whether the change is generated or propagated in the previous stage, and therefore, responds to it in the same way.

Without necessity to investigate other examples fully, it will now be evident that the adder of FIG. 3 will generate properly overlapping pulse signals so as to preclude false insertion of temporary addition results. This is true in the cases involving no changes in the carry-in or carry-out signal states; here, each stage behaves as though a separate single-stage adder, which was described with reference to FIG. 2. It is likewise true in the opposite case where one or more stages undergo two changes in carry-in and carry-out signals. An extreme example is a previous addition of 11111111 and 11111110 followed by a new addition of 11111111 and 00000001, and necessarily also the inverse situation. Here at T2 every half-sum signal and every carry-out signal experiences a change. In the stages 2 and onward, the carry-out signal rechanges to its original condition because of propagation of the carry, namely in stage 2 at T4, in stage 3 at T6, in stage 4 at T8, etc. Since the half-sum and carry-out change pulses necessarily overlap, and since they are of 5.5 unit delay time duration, the objective of entry of the new sum into the register only when valid, is attained. The same will be true in the situations where the sum signal nS undergoes two changes in the higher denominations, the first one at T7 or thereabouts, as in FIG. 2a and the second one subsequently, as for example, the stages 5 to 8 in Table II. This situation might come about from a previous addition of 00000110 and 00000101 followed by a new addition of 11111111 and 00000001, and the converse case, for example.

In summary, the invention is directed to a multi-stage asynchronous static logical chain, which is preferably composed of blocks in turn each composed of transistors of like conductivity type. Alternate blocks include transistors of opposite conductivity types to permit direct interblock coupling, in accord with modern practice. Also in accord with modern practice, the blocks are preferably arranged to produce complementary output signals for utilization of the pair of complementary signals, where this may be desirable, as for example in application to adders-subtracters, where the principal signal is used for addition of addend and the subtrahend complement signal is used also for addition to produce in effect subtraction. Means are provided to generate a pulse signal at the start of each operation of the multi-stage chain, and further pulse generators are connected to the outputs of blocks in the chain. Each further pulse generator produces bipolar pulse signals, one positive and one negative, whenever its exciting signal undergoes a change in level, up or down. The start pulse generator and the further pulse generators have pulse periods such that the successive pulses at least barely overlap one another even if the logical blocks separating successive pulse generator exciting lines have worst inherent time delay. In the ideal, optimum performance would be obtained by having each logical block excite a pulse generator; however, a practically better approach is to have the output of each even-numbered block in the chain, except possibly the last, excite a pulse generator. This permits application of the pulse signals to a transistor "or" block composed of transistors of a conductivity type opposite to that of the pulse generators, thereby avoiding signal conversion means. The output of the "or" block is used to inhibit entry of the output of the last logical stage or other logical stages into devices accepting such outputs until all pulses have terminated, so that only valid, final results are transferred to the accepting devices. In a more specific embodiment of the invention, the technique is applied to a conventional static adder-subtracter stage, with the pulse generators excited by at least the stages delivering half-sum and carry-out signals, and preferably also the full-sum signal; these pulse generators of course are additional to the start pulse signal generator. The device accepting the full sum signal and also the inhibiting signal may be simply a gate, but preferably this gate is integrated with the full sum producing stages of the adder and additional circuitry to form an escapement gate that shares the full sum producing stages with the adder, thereby avoiding duplication of circuitry. The escapement gate generates the usual set-on and set-off signals for a flip flop included within the escapement gate. The flip flop therefore stores only valid addition or subtraction results, and will not store a new result until all temporary addition or subtraction results have vanished. A multi-denominational parallel static adder-subtracter is obtained by cascading individual adder stages, each including its adder proper, an escapement gate and its individual pulse generators. The start pulse generators and the "or" block generating the inhibiting signal may be shared by the several stages in common; however, because of loading requirements the "or" block is broken up into blocks associated individually with each stage in the adder, followed by an "or" block common to all the stages, which also accepts the start pulse. The common "or" block feeds suitable power drive means that produce the inhibiting signals in a pair suitable for application to the opposite conductivity type "and" gates of the escapement gate, that produce the set-on and set-off signals.

While several embodiments of the invention have been described and modifications thereof suggested, it should be understood that further modifications may occur to those skilled in the art without essentially departing from the spirit and scope of the invention.

What is claimed is:

1. In an asynchronous logic system comprising an output gating means and a preceding chain of logical block stages producing respective output signals of the on-off type as logical functions of on-off type input signals applied thereto, the output signals of the successive stages in the chain serving as input signals for the next following stages, an initial one of said stages accepting an on-off type input signal from an external source and a final one of said stages delivering a final output signal to said gating means; means for precluding said gating means from accepting said final output signal while signals produced by said chain are subject to that said gating means accepts only valid, final results, said precluding means comprising a plurality of pulse generating means each adapted to produce a respective pulse, the successive pulses being delayed from one another in accordance with the inherent delay of said stages and overlapping one another, the initial one of said pulse generating means producing a pulse to signify that said chain is to perform a new logical operation and each of the remaining pulse generating means producing a pulse in response to change in state of the output signal of a respective stage in said chain, and an "or" gate receiving said pulses and delivering an inhibiting signal to said gating means, said inhibiting signal being present so long as at least one of said pulses is present, the duration of the last of said pulses being so selected in relation to its respective logical stage output signal that said inhibiting signal is present until the effect of the change of the last mentioned respective output signal is propagated to said gating means.

2. Apparatus according to claim 1, wherein the aforesaid starting pulse has a polarity transmissible by the aforesaid "or" gate, and wherein each of the aforesaid remaining pulse generating means produces a bipolar pair of pulses that are applied to said "or" gate, whereby to assure that one of the pulses in such bipolar pair has a polarity transmissible by said "or" gate in response to change in state in the respective logical stage output signal in either direction.

3. Apparatus according to claim 1 wherein the logical stages, the pulse generating means, and the "or" gate are composed of transistors and are direct coupled to one another.

4. Apparatus according to claim 1 wherein the logical stages are composed alternately of transistors of one conductivity type and of transistors of the other conductivity type and are direct coupled to one another, wherein the even-numbered logical stages are direct coupled to the respective pulse generating means to produce exciting signals for the latter, all the pulse generating means being composed of transistors of the same conductivity type as that of the odd-numbered logical stages and being direct coupled to the aforesaid "or" gate, said "or" gate being composed of transistors of the same conductivity type as the even-numbered stages and being direct coupled to the aforesaid gating means, said gating means being composed of transistors of the same conductivity type as the odd-numbered logical stages.

5. Apparatus according to claim 4, wherein the aforesaid starting pulse has a polarity transmissible by the aforesaid "or" gate, and wherein each of the aforesaid remaining pulse generating means produces a bipolar pair of pulses that are applied to said "or" gate whereby to assure that one of the pulses in such bipolar pair has a polarity transmissible by said "or" gate in response to change in state of the respective exciting signal in either direction.

6. Apparatus according to claim 5, wherein each pulse generating means is composed of a pair of transistors of like conductivity type, the aforesaid exciting signal being applied to the base of one of the transistors in the pair, the base of the other transistor being connected to reference potential, means for applying emitter bias current to said transistor pair to render that transistor conductive whose base is at a potential most favorable to conduction, the other transistor being non-conducting, and a pulse forming network connected in the collector circuit of each transistor, whereby upon change in level of the exciting signal the conducting and non-conducting states of the transistors in the pair are interchanged, the pulse forming network of the transistor rendered newly conductive producing a pulse of one polarity and that of the transistor rendered newly non-conductive producing a pulse of opposite polarity, the latter two pulses constituting the aforesaid bipolar pair.

7. Apparatus according to claim 1, wherein the aforesaid gating means forms the input stage of a register adapted to store the result of the last previous logical operation of the logical chain until the aforesaid inhibiting signal terminates, and then store the result of the completed new logical operation.

8. Apparatus according to claim 1, wherein the chain of logical stages constitutes a binary adder stage receiving external binary addend, augend and carry-in signals and producing an inter-stage binary half-sum signal and final binary sum and carry-out signals, the sum signal being applied to said gating means, the aforesaid remaining pulse generating means being responsive respectively to changes in value of said half-sum, sum, and carry-out signals.

9. Apparatus according to claim 8, including an escapement gate that is formed of the sum signal producing logic of the binary adder, the aforesaid gating means and additional stages including a flip flop for storing the result of the addition, said gating means producing set-on and set-off signals for said flip flop one of which is subject to change in state at the termination of the inhibiting signal to insert into said flip flop the result of the new addition only on completion thereof, whereby temporary addition results are excluded from storage.

10. A static parallel adder comprising a plurality of cascaded adder stages as specified in claim 8 receiving individual addend and augend bit signals, the carry-out signal of a given adder stage serving as the carry-in signal for the next higher denominational adder stage, the aforesaid remaining pulse generating means and gating means being individual to each adder stage, and at least part of the aforesaid "or" gate being common to all adder stages and producing the inhibiting signal in common for all adder stages, whereby said gating means concurrently admit the results of a new addition at such time as the results of all stages are valid.

11. A static parallel adder comprising a plurality of cascaded adder stages as specified in claim 9 receiving individual addend and augend bit signals, the carry-out signal of a given adder stage serving as carry-in signal for the next higher denominational adder stage, the aforesaid remaining pulse generating means and escapement gate being individual to each adder stage, and at least part of the aforesaid "or" gate being common to all said adder stages and producing the inhibiting signal in common for all adder stages, whereby the flip flop concurrently admit the results of a new addition at such time as the results of all stages are valid.

12. In a logic system, a plurality of logic circuits connected in a predetermined relation, each of said logic circuits responding to an output from a previous stage to initiate one or more switching operations in that stage, and means providing one signal for the arrival of valid data from a previous stage at a succeeding stage, and a second signal to a succeeding stage as long as the valid data is not present, the first signal initiating the switching operations in the succeeding stage, and the second signal preventing switching operations in the succeeding stage.

13. An asynchronous timing circuit for a cascaded logical system containing a plurality of logical circuit stages, each of said logical stages having an input and an output, said logical circuit stages being coupled together in series with the output of each stage except the last being coupled to the input of the succeeding stage and the input of each stage except the first being coupled to the output of the preceding stage, and said cascaded logical system being adapted to receive logical input signals on the input of said first stage thereof and to produce logical output signals on the output of said last stage thereof, said asynchronous timing circuit comprising a plurality of pulse generators each having an input and an output, each of said pulse generators being adapted to produce a pulse of predetermined time duration on the output thereof when triggered on the input thereof, the input of each of said pulse generators being coupled to the output of a corresponding logical circuit stage, and each of said pulse generators being adapted to be triggered by output signals from the corresponding logical circuit stage, a timing output circuit having a plurality of inputs and an output, each input of said timing output circuit being coupled to the output of one of said pulse generators, said timing output circuit being adapted to produce a first timing output signal indicating the presence of a pulse on any one of said inputs thereof and a second timing output signal indicating the absence of pulses on all of said inputs thereof, and the pulse durations of said pulse generators being selected to be overlapping in time with respect to signals propagated down said cascaded logical system, whereby said second timing output signal of said timing output circuit is an indication of a valid logical output signal on the output of the last stage of said cascaded logical system.

14. The combination defined in claim 13 in which the time duration of the output pulse from each pulse generator is longer than the time required for a signal to propagate from the output of the logical circuit stage coupled to the input of said pulse generator to the output of the next logical circuit stage which is coupled to the input of a pulse generator, whereby the output of said pulse generators are overlapping in time with respect to signals propagated down said cascaded logical system.

15. The combination defined in claim 14 in which said output circuit comprises an OR circuit.

References Cited in the file of this patent

Fast Carry Logic for Digital Computer, IRE Transactions Electronic Computers V. EC-4 No. 4, pp. 133–136, December 1955.